US010852590B2

(12) United States Patent
Hara

(10) Patent No.: US 10,852,590 B2
(45) Date of Patent: Dec. 1, 2020

(54) LIQUID CRYSTAL DISPLAY DEVICE

(71) Applicant: Sharp Kabushiki Kaisha, Sakai (JP)

(72) Inventor: Yoshihito Hara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/490,913

(22) PCT Filed: Feb. 27, 2018

(86) PCT No.: PCT/JP2018/007085
§ 371 (c)(1),
(2) Date: Nov. 13, 2019

(87) PCT Pub. No.: WO2018/163892
PCT Pub. Date: Sep. 13, 2018

(65) Prior Publication Data
US 2020/0073161 A1    Mar. 5, 2020

(30) Foreign Application Priority Data

Mar. 6, 2017   (JP) .................................. 2017-041735

(51) Int. Cl.
*G02F 1/1339* (2006.01)
*G02F 1/1333* (2006.01)
(Continued)

(52) U.S. Cl.
CPC ...... *G02F 1/1339* (2013.01); *G02F 1/133345* (2013.01); *G02F 1/136227* (2013.01); *G09G 3/3648* (2013.01)

(58) Field of Classification Search
CPC ............... G02F 1/1339; G02F 1/13345; G02F 1/136227; G09G 3/3648
(Continued)

(56) References Cited

U.S. PATENT DOCUMENTS

2015/0355516 A1    12/2015  Imai et al.
2016/0048045 A1*   2/2016   Imai ...................... H01L 27/127
                                                             349/123

FOREIGN PATENT DOCUMENTS

JP        2013-160965 A     8/2013
WO        2014/103922 A1    7/2014

OTHER PUBLICATIONS

Official Communication issued in International Patent Application No. PCT/JP2018/007085, dated May 22, 2018.

* cited by examiner

*Primary Examiner* — Nathanael R Briggs
*Assistant Examiner* — William D Peterson
(74) *Attorney, Agent, or Firm* — Keating & Bennett, LLP

(57) ABSTRACT

A liquid crystal display device includes substrates, a liquid crystal layer between the substrates, a seal member between the substrates and surrounding the liquid crystal layer, an electrode in a first region of one of the substrates, the first region overlapping a region surrounded by the seal member, a first conductive film in a second region of the one substrate, the second region being a region outside the seal member, a second conductive film in the one substrate and extending from the electrode toward the first conductive film, a first insulating film disposed between the first and second conductive films, including a contact hole in a portion of the second region overlapping the first conductive film, and the first conductive film and the second conductive film being electrically connected to each other through the contact hole, and a second insulating film that covers the contact hole and is moisture-proof.

5 Claims, 10 Drawing Sheets

(51) Int. Cl.
*G02F 1/1362* (2006.01)
*G09G 3/36* (2006.01)

(58) Field of Classification Search
USPC .......................................................... 349/153
See application file for complete search history.

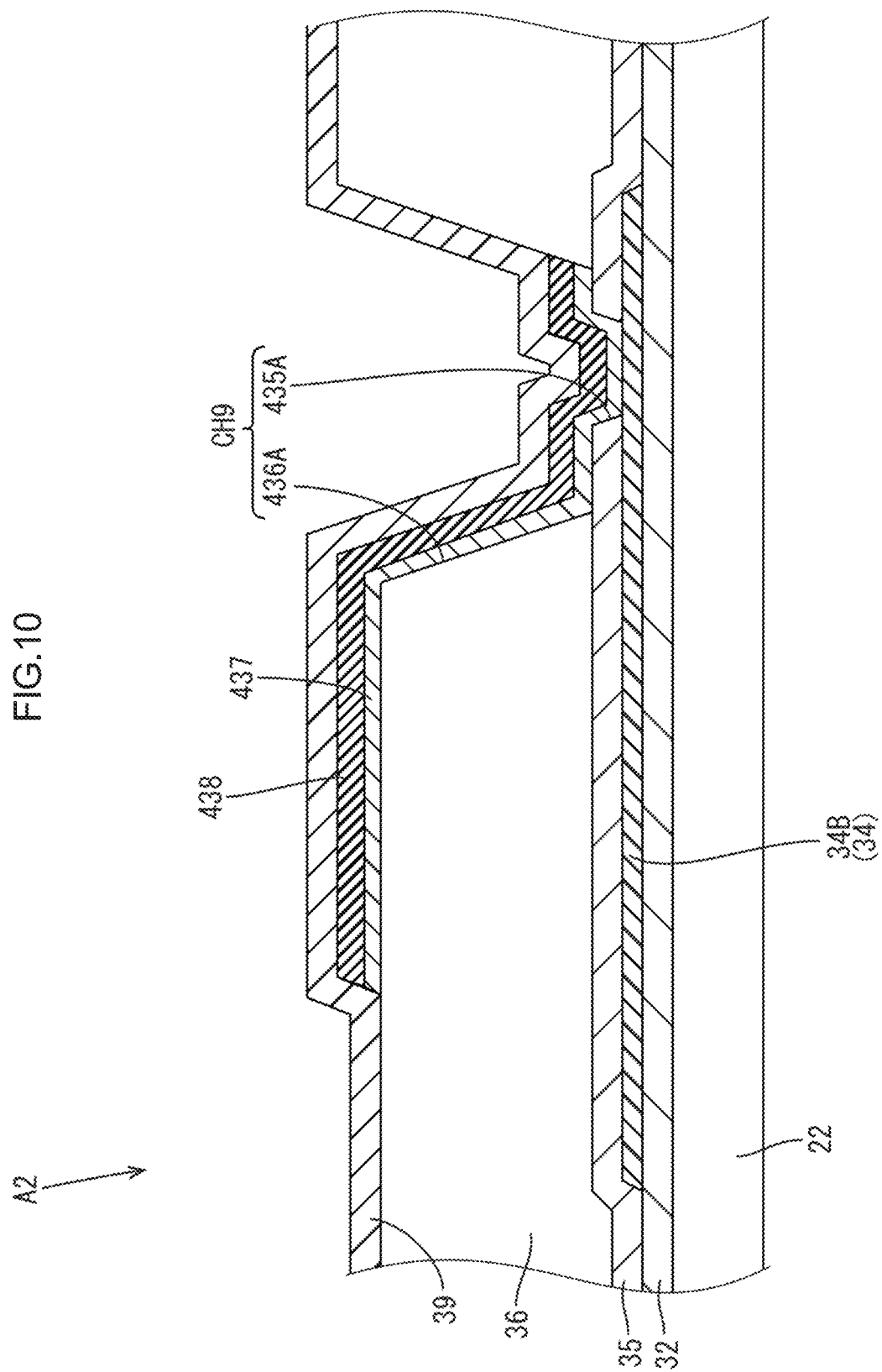

LIQUID CRYSTAL DISPLAY DEVICE

TECHNICAL FIELD

The present invention relates to a liquid crystal display device.

BACKGROUND ART

Conventionally, as a liquid crystal display device, there is known a liquid crystal display device in which a liquid crystal layer is disposed between a pair of substrates and a seal member for sealing the liquid crystal layer is provided (Patent Document 1 below). In Patent Document 1, a portion surrounded by the seal member is a display region, and an outside of the display region is a mounting region for mounting a mounting component. In addition, various signal lines provided in the display region are connected to terminals provided in the mounting region. Here, when the signal lines and the terminals are disposed in different layers on the substrate, it is necessary to connect the signal lines and the terminals via contact holes.

RELATED ART DOCUMENT

Patent Document

Patent Document 1: Japanese Unexamined Patent Application Publication No. 2013-160965

Problem to be Solved by the Invention

In recent years, the number of signal lines tends to increase as the liquid crystal display devices have higher definition and higher functionality. Accordingly, as a result of increasing a space for arranging the signal lines, it may be difficult to provide contact holes inside a region surrounded by the seal member. When the contact holes are provided in an outer region of the seal member, a conductive film constituting the terminal or signal line becomes susceptible to moisture, and there is a concern that the conductive film may be corroded by exposure to moisture.

DISCLOSURE OF THE PRESENT INVENTION

The present invention has been completed based on the above circumstances, and an object of the present invention is that a conductive film is less likely to be exposed to moisture in a portion where a contact hole is formed when the contact hole is formed in a region outside a seal member.

Means for Solving the Problem

In order to solve the above-described problem, a liquid crystal display device according to the present invention includes: a pair of substrates disposed facing each other; a liquid crystal layer disposed between the pair of substrates; a seal member disposed between the pair of substrates and surrounding the liquid crystal layer to seal the liquid crystal layer; an electrode included in a first region of one substrate of the pair of substrates, the first region overlapping a region surrounded by the seal member; a first conductive film included in a second region of the one substrate, the second region being a region outside the seal member; a second conductive film included in the one substrate and extending from the electrode toward the first conductive film; a first insulating film disposed between the first conductive film and the second conductive film, the first insulating film including a contact hole in a portion of the second region overlapping the first conductive film, and the first conductive film and the second conductive film being electrically connected to each other through the contact hole; and a second insulating film that covers the contact hole and is moisture-proof.

According to the above configuration, by having the contact hole, the first conductive film and the second conductive film can be disposed in different layers, and the degree of freedom in design can be increased. Further, by providing the contact hole in the second region, the portion where the electrode and the second conductive film can be disposed in the first region can be increased as compared with the configuration in which the contact hole is provided in the first region, and an arrangement of the electrode and the second conductive film can be easily designed. However, since the second region is a region corresponding to the outside of the seal member, the second region is more susceptible to moisture than the first region corresponding to the inside of the seal member is, and there is a concern that the first conductive film may be exposed to moisture in a portion where the contact hole is formed. By providing the second insulating film that covers the contact hole provided in the second region as in the above configuration, the situation where the first conductive film is exposed to moisture can be suppressed.

In addition, the liquid crystal display device may further include: a third conductive film included in the one substrate and disposed on a liquid crystal layer side with respect to the first conductive film and the second conductive film, the third conductive film connecting the first conductive film and the second conductive film, and the third conductive film being connected to the first conductive film through the contact hole; and a third insulating film disposed between the second conductive film and the third conductive film, the third conductive film including a second conductive film side contact hole in a portion of the second area overlapping the second conductive film, and the third conductive film and the second conductive film being electrically connected to each other through the second conductive film side contact hole, and the second insulating film may cover the second conductive film side contact hole.

If the first conductive film and the second conductive film are connected by the third conductive film, the third conductive film can be provided in a different layer from those of the first conductive film and the second conductive film, and as compared with the configuration in which the first conductive film and the second conductive film are directly connected, the degree of freedom in design can be increased. In addition, by covering the second conductive film side contact hole with the second insulating film, the situation where the second conductive film is exposed to moisture can be suppressed.

In addition, the third conductive film may be a transparent electrode film. By forming the third conductive film closer to the liquid crystal layer side than the first conductive film and the second conductive film do with the transparent electrode film, for example, it is possible to form the third conductive film in a step of forming the pixel electrode (or common electrode) formed of the transparent electrode film.

In addition, the electrode and a position input body that performs a position input create a capacitance therebetween, and the electrode may be a position detection electrode that detects an input position performed by the position input body, and the electrode includes electrodes that are disposed in the first region. The liquid crystal display device may further include: a plurality of pixel electrodes disposed in the first region; a driver disposed in the second region, electrically connected to the pixel electrodes and the position detection electrodes, and configured to drive the pixel electrodes and the position detection electrodes; and a pixel electrode line included in the one substrate and electrically connecting the pixel electrodes and the driver. The second conductive film may include a section as a line that electrically connects the position detection electrode and the driver. The first conductive film may include a section as a terminal portion of a driver side line connected to the driver.

According to the above configuration, each of the pixel electrode lines drawn from the pixel electrodes and each of the second conductive films drawn from the position detection electrodes may be disposed so as to extend toward the driver. In such a configuration, pixel electrode signal lines and second conductive films are densely packed at an end portion of a driver side in the first region, and it is difficult to secure a space for forming a contact hole related to the connection between the first conductive film and the second conductive film. As a result, it is necessary to form the contact hole in the second region. The above configuration is preferable because the second insulating layer protects against moisture even when the contact hole is formed in the second region.

In addition, the first conductive film may be included in a same layer as the pixel electrode line in the one substrate and may be made of a same material as that of the pixel electrode line. With such a configuration, the first conductive film and the pixel electrode line can be formed in one step.

In addition, the liquid crystal display device may further include a pixel electrode included in the one substrate, and a switching element included in the one substrate and electrically connected to the pixel electrode, and the switching element may be a TFT including an oxide semiconductor. Since the oxide semiconductor has high mobility, the switching element can be further downsized.

Advantageous Effect of the Invention

According to the present invention, a conductive film is less likely to be exposed to moisture in a portion where a contact hole is formed.

BRIEF DESCRIPTION OF THE DRAWINGS

FIG. 10 is a plan view showing a contact hole in a second region of an array substrate according to a fifth embodiment.

MODES FOR CARRYING OUT THE INVENTION

First Embodiment

Figure 1:
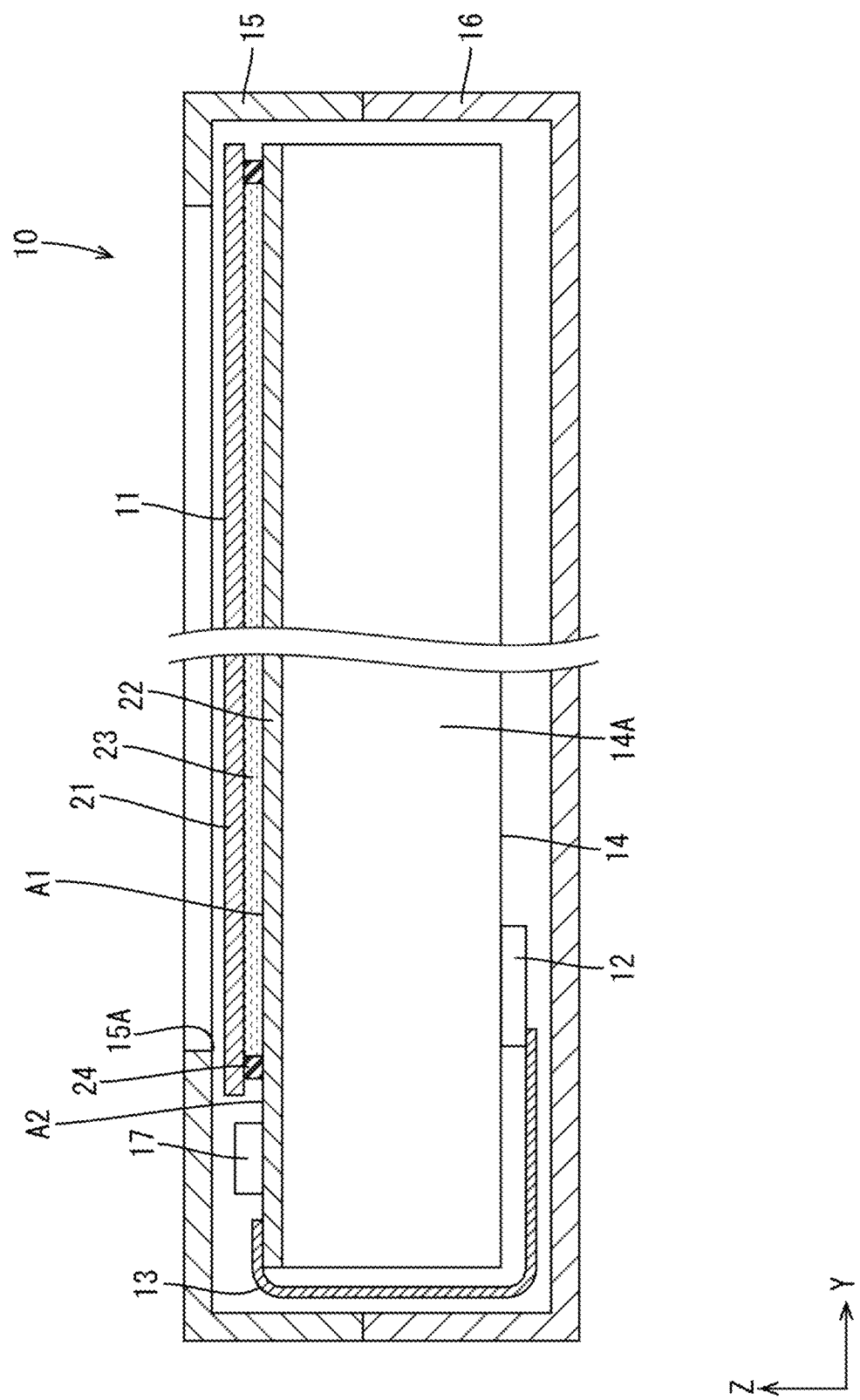
FIG. 1 is a cross-sectional view of a liquid crystal display device according to a first embodiment of the present invention, taken along a cutting line along a longitudinal direction (Y-axis direction).

A first embodiment of the present invention will be described with reference to FIGS. 1 to 5. An X axis, a Y axis, and a Z axis are shown in a part of each drawing, and each axis direction is drawn to be the direction shown in each drawing. As shown in FIG. 1, a liquid crystal display device 10 includes a liquid crystal panel 11 (display panel), a driver 17 (panel driving unit) for driving the liquid crystal panel 11, a control circuit board 12 (external signal supply source) for supplying various input signals to the driver 17 from the outside, a flexible substrate 13 (external connection component) for electrically connecting the liquid crystal panel and the control circuit board 12 in the outside, and a backlight device 14 (lighting device) that is an external light source for supplying light to the liquid crystal panel 11. As shown in FIG. 1, the backlight device 14 includes a substantially box-shaped chassis 14A opened toward a front side (liquid crystal panel 11 side), a light source (not shown) (for example, a cold cathode tube, an LED, an organic EL, etc.) disposed in the chassis 14A, and an optical member (not shown) disposed to cover an opening of the chassis 14A. The optical member has a function such as converting light emitted from the light source into a planar shape.

In addition, the liquid crystal display device 10 includes a pair of front and back exterior members 15 and 16 for housing and holding the liquid crystal panel 11 and the backlight device 14 assembled to each other, and the exterior member 15 on the front side of the two exterior members has an opening 15A for visual recognition of an image displayed in a display region AA (see FIG. 2) of the liquid crystal panel 11. The liquid crystal display device 10 according to the present embodiment is used in various electronic devices (not shown) such as a mobile phone (including a smartphone), a notebook computer (including a tablet notebook computer), a wearable terminal (including a smart watch), a portable information terminal (including an electronic book, a PDA, etc.), a portable game machine, and a digital photo frame. For this reason, the screen size of the liquid crystal panel 11 constituting the liquid crystal display device 10 is about several inches to ten-odd inches, and is generally a size classified as a small size or a small and medium size.

Figure 2:
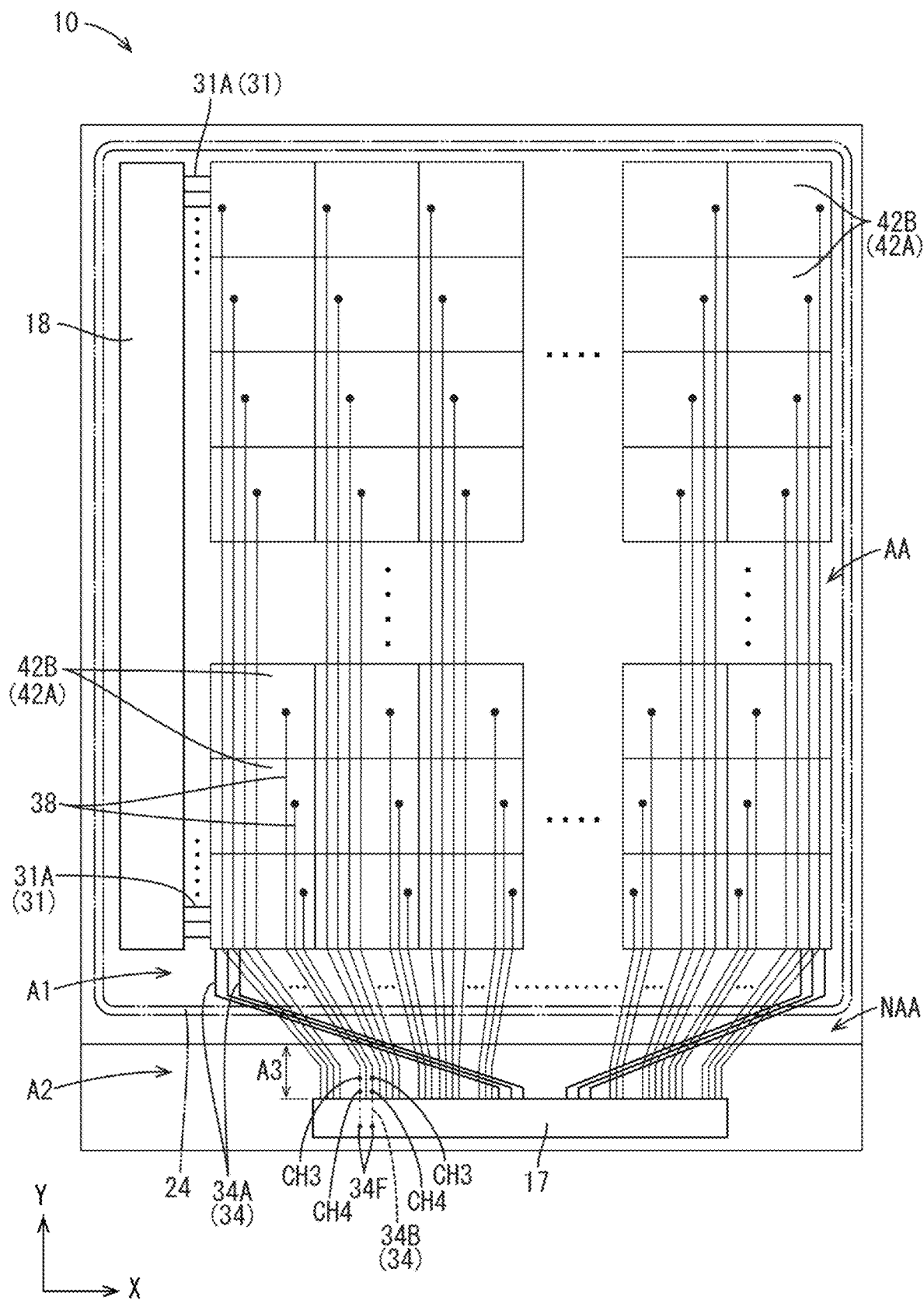
FIG. 2 is a plan view showing an array substrate in a liquid crystal panel.

The liquid crystal panel 11 has a display region AA that can display an image and a non-display region NAA that is disposed on an outer peripheral side so as to surround the display region AA. As shown in FIG. 2, the liquid crystal panel 11 has a vertically long rectangular shape (rectangular shape) as a whole, and the driver 17 is attached to one end portion (lower side shown in FIG. 1) in a long side direction. The driver 17 is formed of an LSI chip having a drive circuit therein. The driver 17 operates based on a signal supplied from the control circuit board 12 that is a signal supply source to process an input signal supplied from the control circuit board 12 that is the signal supply source and generate an output signal, and outputs the output signal toward the display region AA of the liquid crystal panel 11.

As shown in FIG. 1, the liquid crystal panel 11 includes a pair of substrates 21 and 22 disposed facing each other, a liquid crystal layer 23 (medium layer) disposed between the pair of substrates 21 and 22 and including liquid crystal molecules whose optical characteristics change with application of an electric field, and a seal member 24 disposed between the pair of substrates 21 and 22 and surrounding the liquid crystal layer 23 to seal the liquid crystal layer 23. Of the pair of substrates 21 and 22, a front side (front surface side) substrate is a CF substrate 21 (counter substrate), and a back side (back surface side) substrate is an array substrate 22 (active matrix substrate, element substrate). Each of the CF substrate 21 and the array substrate 22 is formed by laminating various films on an inner surface side of a glass substrate made of glass. Note that a polarizing plate (not shown) is attached to each outer surface side of the substrates 21 and 22. On the inner surface side (liquid crystal layer 23 side) of the CF substrate 21, a color filter, an overcoat film (flattening film), and an alignment film (none of which are shown) are provided. The color filter includes colored portions of three colors R (red), G (green), and B (blue) arranged in a matrix. Each colored portion is disposed to face to each pixel electrode (described later) provided on the array substrate 22, and a pixel includes a set of a colored portion and a pixel electrode.

As shown by a two-dot chain line in FIG. 2, the seal member 24 has a rectangular frame shape in a plan view. In the following description, a region overlapping the region surrounded by the seal member 24 in the array substrate 22 (one of the pair of substrates) is referred to as a first region A1, and a region corresponding to the outside of the seal member 24 in the array substrate 22 is referred to as a second region A2. The first region A1 includes the display region AA in a plan view. As shown in FIG. 1, the second region A2 is a region that is more susceptible to moisture than the first region A1 surrounded by the seal member 24 is.

Figure 3:
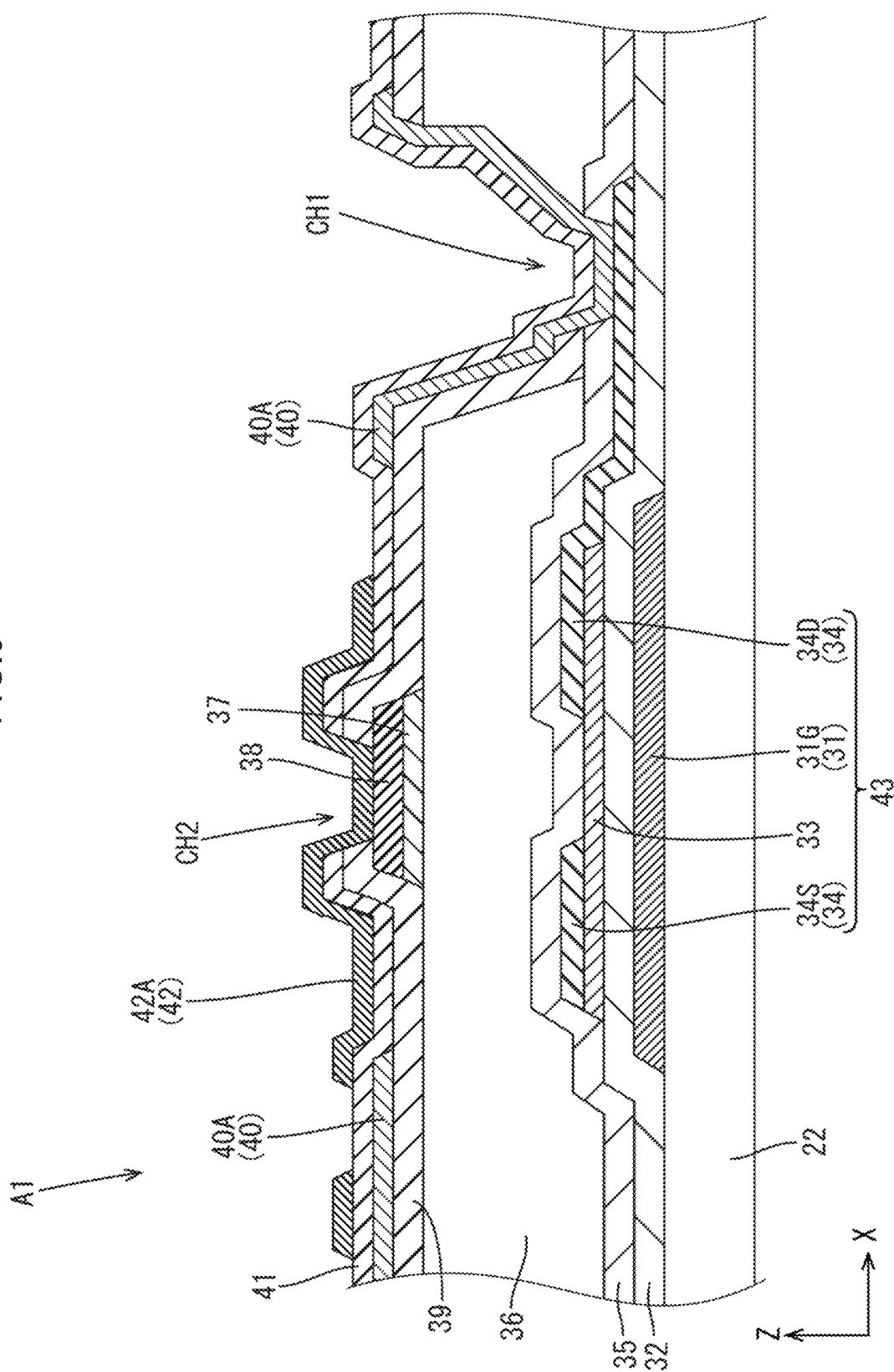
FIG. 3 is a cross-sectional view showing a TFT in a first region of the array substrate.

Various films are laminated on the inner surface side of the array substrate 22 (a liquid crystal layer 23 side, a side of the surface facing the CF substrate 21), as shown in FIG. 3. On the array substrate 22, a gate conductive film 31 (gate metal), a gate insulating film 32, a semiconductor film 33, a source conductive film 34 (source metal), an insulating film 35, a flattening film 36, a conductive film 37, a line 38, an insulating film 39, a transparent electrode film 40, an insulating film 41, and a transparent electrode film 42 are sequentially laminated from a lower layer side of the array substrate 22.

The gate conductive film 31, which is a single layer film made of one kind of metal material or a laminated film or alloy made of different kinds of metal materials, has conductivity and light shielding properties and constitutes a gate line 31A (see FIG. 2), a gate electrode 31G of a TFT 43, or the like. That is, the gate line 31A and the gate electrode 31G are disposed in an identical layer. In addition, the gate line 31A is connected to a gate driver 18 provided on the array substrate 22, as shown in FIG. 2. The gate insulating film 32 mainly keeps the gate conductive film 31 and the semiconductor film 33 in an insulated state. The semiconductor film 33 constitutes a channel portion (semiconductor portion) connected to a source electrode 34S and a drain electrode 34D in the TFT 43. The semiconductor film 33 is made of, for example, a thin film including an oxide semiconductor. As an oxide semiconductor used in the semiconductor film 33, an In—Ga—Zn—O-based semiconductor (indium gallium zinc oxide) can be exemplified. The source conductive film 34, which is a single layer film or a laminated film or alloy made of one kind of metal material or two or more kinds of metal materials, has conductivity and light shielding properties and constitutes a source line 34A (see FIG. 2), the source electrode 34S and the drain electrode 34D of the TFT 43, or the like. That is, the source conductive film 34 can also be called a drain conductive film, and the source line 34A, the source electrode 34S, and the drain electrode 34D are disposed in an identical layer.

The insulating film 35 is disposed on at least the source conductive film 34. The flattening film 36 is disposed on the insulating film 35, and is made of, for example, an acrylic resin material (for example, polymethyl methacrylate resin (PMMA)) that is an organic resin material. The flattening film 36 is an organic insulating film, has a film thickness larger than that of other inorganic insulating films (the insulating films 32, 35, 39, and 41), and has a function of flattening the surface. The conductive film 37 is disposed on the flattening film 36 and has a function of improving adhesion between the line 38 and the flattening film 36. Note that the conductive film 37 does not have to be provided. The line 38 is made of, for example, one of copper (Cu), titanium (Ti), molybdenum (Mo), aluminum (Al), magnesium (Mg), cobalt (Co), chromium (Cr), and tungsten (W), or a mixture thereof. The insulating film 39 is disposed so as to cover a part of the flattening film 36 and the line 38.

The transparent electrode film 40 is disposed on the insulating film 39. The transparent electrode film 40 is made of a transparent electrode material (for example, Indium Tin Oxide (ITO)) and mainly constitutes a pixel electrode 40A. The insulating film 41 is disposed so as to cover the transparent electrode film 40 and the insulating film 39. The transparent electrode film 42 is disposed on the insulating film 41. The transparent electrode film 42 is made of a transparent electrode material (for example, Indium Tin Oxide (ITO)) and mainly constitutes a common electrode 42A. The gate insulating film 32, the insulating film 35, the insulating film 39, and the insulating film 41 are inorganic insulating films made of an inorganic material such as silicon nitride ($SiN_x$) and silicon oxide ($SiO_2$), and are moisture-proof. Pixel Electrodes 40A are disposed in a matrix in the display region AA (that is, the first region A1). In addition, in the display region AA, TFTs 43 serving as a switching element are disposed in a matrix corresponding to the pixel electrodes 40A. The TFT 43 includes the gate electrode 31G, the semiconductor film 33, the source electrode 34S, and the drain electrode 34D.

In the insulating film 35, the flattening film 36, and the insulating film 39, a contact hole CH1 is formed in a portion overlapping the drain electrode 34D so as to penetrate through the insulating film 35, the flattening film 36, and the insulating film 39. The contact hole CH1 is opened to a liquid crystal layer 23 side, and the pixel electrode 40A is connected to the drain electrode 34D through the contact hole CH1. The gate line 31A and the source line 34A (see FIG. 2) are disposed in a lattice shape around the TFT 43 and the pixel electrode 40A. The TFT 43 is disposed in a portion where the gate line 31A and the source line 34A intersect and is driven based on various signals supplied to each of the gate line 31A and the source line 34A, such that a supply of a potential to the pixel electrode 40A is controlled in accordance with the driving. In addition, the common electrode 42A has slits (not shown). When a potential difference is generated between the pixel electrode 40A and the common electrode 42A, a fringe electric field (an oblique electric field) including a component in a normal direction to a plate surface of the array substrate 22 in addition to a component along the plate surface of the array substrate 22 is generated between the common electrode 42A and the pixel electrode 40A. Accordingly, an image can be displayed on the display region AA by controlling an alignment state of the liquid crystal molecules contained in the liquid crystal layer 23 using the fringe electric field. That is, in the liquid crystal panel 11 according to the present embodiment, an operation mode is a fringe field switching (FFS) mode.

In addition, the liquid crystal panel 11 according to the present embodiment has both a display function of displaying an image and a touch panel function (position input function) of detecting a position input by a user (the position is referred to as an input position) based on the displayed image, and integrates (in-cell integrates) a touch panel pattern for demonstrating the touch panel function of both the functions. The touch panel pattern is of a so-called projection capacitive type, and a detection system of the touch panel pattern is a self-capacitive system. As shown in FIG. 2, the touch panel pattern is formed of position detection electrodes 42B (touch electrodes) disposed side by side in a matrix in the plate surface of the array substrate 22.

The position detection electrodes 42B are disposed in the display region AA (a part of the first region A1) of the array substrate 22. When the user of the liquid crystal display device 10 brings a finger (position input body, not shown) as a conductor close to a surface (display surface) of the liquid crystal panel 11, a capacitance is formed between the finger and a position detection electrode 42B. Since the capacitance detected by a position detection electrode 42B near the finger is different from the capacitance of a position detection electrode 42B far from the finger, it is possible to detect the input position based on such a difference. The position detection electrode 42B is formed of the common electrode 42A. As shown in FIG. 3, in the insulating films 39 and 41, a contact hole CH2 is formed in a portion overlapping the line 38 so as to penetrate through the insulating films 39 and 41. The contact hole CH2 is opened to a liquid crystal layer 23 side (upper side in FIG. 3), and the common electrode 42A (position detection electrode 42B) is connected to the line 38 through the contact hole CH2.

As shown in FIG. 2, each of the lines 38 (second conductive film) extends from each of the position detection electrodes 42B (electrodes) toward the driver 17 (and thus a driver side line 34B), and is electrically connected to the driver 17 via the driver side line 34B (details will be described later). In a control of detecting the input position related to the position detection electrodes 42B, the control circuit board 12 supplies a drive signal for detecting the input position to the position detection electrodes 42B via the driver 17 and the line 38, and receives a detection signal via the driver 17 and the line 38. That is, the driver 17 has a configuration configured to drive the position detection electrodes 42B by supplying a drive signal to each of the position detection electrodes 42B. In addition, the driver 17 is electrically connected to the pixel electrodes 40A via the source lines 34A and has a configuration configured to drive the pixel electrodes 40A by supplying a drive signal to each of the pixel electrodes 40A. The lines 38 and the source lines 34A extend so as to converge toward the driver 17 in a plan view.

Figure 4:
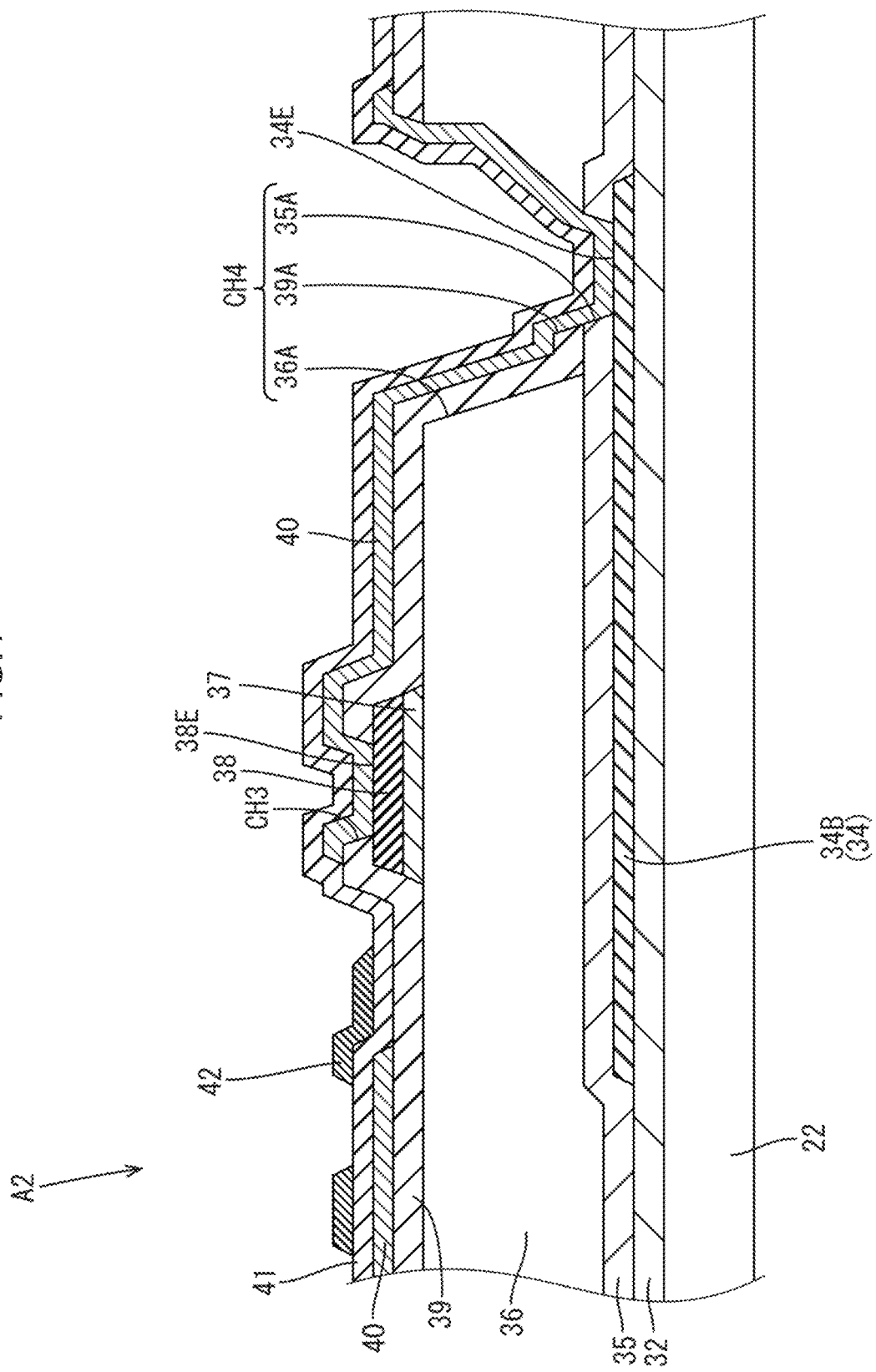
FIG. 4 is a cross-sectional view showing a contact hole in a second region of the array substrate (corresponding to a view taken along line IV-IV in FIG. 5).

As shown in FIG. 2, the driver 17 and the driver side line 34B are provided in the second region A2, and the driver side line 34B (first conductive film) constitutes a terminal portion 34F connected to the driver 17. As shown in FIG. 4, the driver side line 34B is formed of the source conductive film 34. That is, the driver side line 34B is formed in an identical layer with a layer of the source line 34A (pixel electrode line) in the array substrate 22 and is made of an identical material with a material of the source line 34A. The line 38 and the driver side line 34B are disposed in different layers, and specifically, the insulating film 35 (first insulating film) and the flattening film 36 (first insulating film) are interposed between the line 38 and the driver side line 34B.

In addition, the line 38 and the driver side line 34B are connected via the transparent electrode film 40 (third conductive film). The transparent electrode film 40 is disposed on an inner surface side of the array substrate 22 (an upper side in FIG. 4 and corresponding to the liquid crystal layer side) with respect to the line 38 and the driver side line 34B. In the insulating film 39 in the second region A2, a contact hole CH3 (second conductive film side contact hole) is formed so as to penetrate through the insulating film 39 (third insulating film) in a portion overlapping both the line 38 and the transparent electrode film 40. The contact hole CH3 is opened to the inner surface side (upper side in FIG. 4) of the array substrate 22, and the line 38 is connected to the transparent electrode film 40 via the contact hole CH3.

In addition, in the insulating film 35, the flattening film 36, and the insulating film 39 in the second region A2, a contact hole CH4 (a contact hole included in the first insulating film) is formed in a portion overlapping both the driver side line 34B and the transparent electrode film 40 so as to penetrate through the insulating film 35, the flattening film 36, and the insulating film 39. The contact hole CH4 is opened to the inner surface side (upper side in FIG. 4) of the array substrate 22, and includes a through hole 35A in the insulating film 35, a through hole 36A in the flattening film 36, and a through hole 39A in the insulating film 39.

Figure 5:
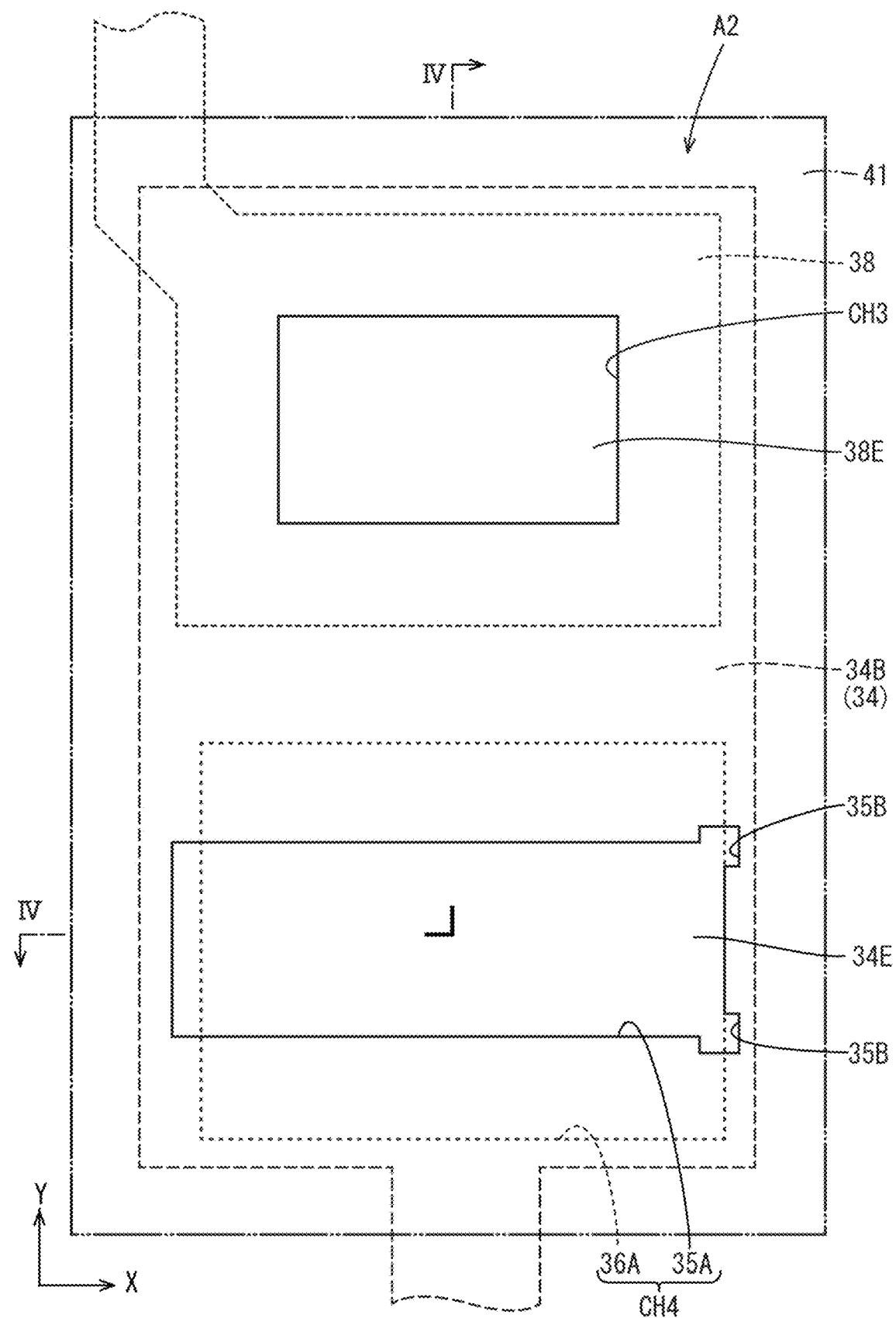
FIG. 5 is a plan view showing the contact hole in the second region of the array substrate.

The driver side line 34B is connected to the transparent electrode film 40 via the contact hole CH4. In addition, in the second region A2, the insulating film 41 (second insulating film) is disposed so as to cover both the contact holes CH3 and CH4. That is, the insulating film 41 is configured to cover an exposed portion 34E of the driver side line 34B exposed by the contact hole CH4 and an exposed portion 38E of the line 38 exposed by the contact hole CH3. In addition, as shown in FIG. 5, the through hole 36A in the flattening film 36 has a larger value in the Y-axis direction and a smaller value in the X-axis direction relative to the through hole 35A in the insulating film 35. In addition, the through hole 35A has a longitudinal and substantially rectangular shape in a plan view, and cutout portions 35B are each formed in a pair of corners each constituting one end in the longitudinal direction. Each of the cutout portions 35B is disposed so as to overlap a hole edge of the through hole 36A.

In addition, as shown in FIG. 2, the source lines 34A are disposed, for example, so as to converge at a central portion of the driver 17 in the longitudinal direction. On the other hand, the lines 38 are connected over the entire length of the driver 17 in the longitudinal direction. For this reason, in the region A3 near the driver 17 in the second region A2, the line 38 disposed on the center side among the lines 38 disposed in the X-axis direction is disposed so as to overlap with the source line 34A in a plan view, but the lines 38 disposed on both ends are disposed so as not to overlap with the source line 34A in a plan view. That is, the region A3 is a region in which the source line 34A and the line 38 are difficult to overlap as compared with other regions, and the contact holes CH3 and CH4 are disposed in the region A3.

Next, the effect of the present embodiment will be described. According to the present embodiment, by having the contact hole CH4, the driver side line 34B and the line 38 can be disposed in different layers, and the degree of freedom in design can be increased. In addition, by providing the contact hole CH4 in the second region A2, the portion where the position detection electrode 42B and the line 38 can be disposed in the first region A1 can be increased as compared with the configuration in which the contact hole CH4 is provided in the first region A1, and the arrangement of the position detection electrode 42B and the line 38 can be easily designed. Here, as shown in FIG. 1, the inner surface side (upper surface side in FIG. 1) of the first region A1 of the array substrate 22 is a sealed space (a space in which the liquid crystal layer 23 is disposed) surrounded by the seal member 24, and is thus less susceptible to moisture. On the other hand, since the second region A2 is a region corresponding to the outside of the seal member 24, the second region A2 is more susceptible to moisture than the first region A1 corresponding to the inside of the seal member 24 is, and there is a concern that the driver side line 34B may be exposed to moisture in a portion where the contact hole CH4 is formed. By providing the insulating film 41 that covers the contact hole CH4 provided in the second region A2 as in the above configuration, it is possible to suppress the situation where the driver side line 34B is exposed to moisture.

In addition, the liquid crystal display device includes the transparent electrode film 40 provided on the array substrate 22, disposed on a liquid crystal layer 23 side with respect to the driver side line 34B and the line 38, and connecting the driver side line 34B and the line 38, the transparent electrode film 40 and the driver side line 34B being connected via the contact hole CH4, and includes the insulating film 39 interposed between the line 38 and the transparent electrode film 40, provided in a portion overlapping the line 38 in the second region A2, and having a contact hole CH3 for electrically connecting the transparent electrode film 40 and the line 38, and the insulating film 41 covers the contact hole CH3.

If the driver side line 34B and the line 38 are connected by the transparent electrode film 40, the transparent electrode film 40 can be provided in a different layer from those of the driver side line 34B and the line 38, and the degree of freedom in design can be increased as compared with the configuration in which the driver side line 34B and the line 38 are directly connected to each other. Then, by covering the contact hole CH3 with the insulating film 41, the situation where the line 38 is exposed to moisture can be suppressed. In addition, the contact hole CH4 is a hole that penetrates through the flattening film 36 and the insulating film 35. Meanwhile, as shown in FIG. 3, the contact hole CH1 for connecting the pixel electrode 40A and the drain electrode 34D is also a hole that penetrates through the flattening film 36 and the insulating film 35. Therefore, the contact hole CH4 can be formed in one step with the contact hole CH1, and there is no need to provide a dedicated step for forming the contact hole CH4.

In addition, by forming the conductive film closer to the liquid crystal layer 23 side than the driver side line 34B and the line 38 do with the transparent electrode film 40, for example, it is possible to form the conductive film that connects the driver side line 34B and the line 38 in a step of forming the pixel electrode 40A formed of a transparent electrode film.

In addition, the position detection electrodes 42B are provided in the first region A1, the liquid crystal display device 10 further includes the pixel electrodes 40A provided in the first region A1, the driver 17 provided in the second region A2, electrically connected to both the pixel electrodes 40A and the position detection electrodes 42B, and configured to drive both the pixel electrodes 40A and the position detection electrodes 42B, and the source line 34A for electrically connecting the pixel electrodes 40A and the driver 17, the line 38 constitutes a line for electrically connecting the position detection electrodes 42B and the driver 17, and the driver side line 34B constitutes a terminal portion 34F of the line connected to the driver 17.

According to the above configuration, each of the source lines 34A drawn from the pixel electrodes 40A and each of the lines 38 drawn from the position detection electrodes 42B are disposed so as to extend toward the driver 17. In such a configuration, the source lines 34A and the lines 38 are densely packed at an end portion of the driver 17 side in the first region A1, and it is difficult to secure a space for forming a contact hole related to the connection between the first conductive film and the second conductive film. As a result, it is necessary to form the contact hole in the second region. The above configuration is preferable because the second insulating layer protects against moisture even when the contact hole is formed in the second region.

In addition, the driver side line 34B is formed in an identical layer with a layer of the source line 34A in the array substrate 22 and is made of an identical material with a material of the source line 34A. With such a configuration, the driver side line 34B and the source line 34A can be formed in one step. In addition, the TFT 43 is a TFT including an oxide semiconductor. Since the oxide semiconductor has high mobility, the switching element can be further downsized.

Second Embodiment

Figure 6:
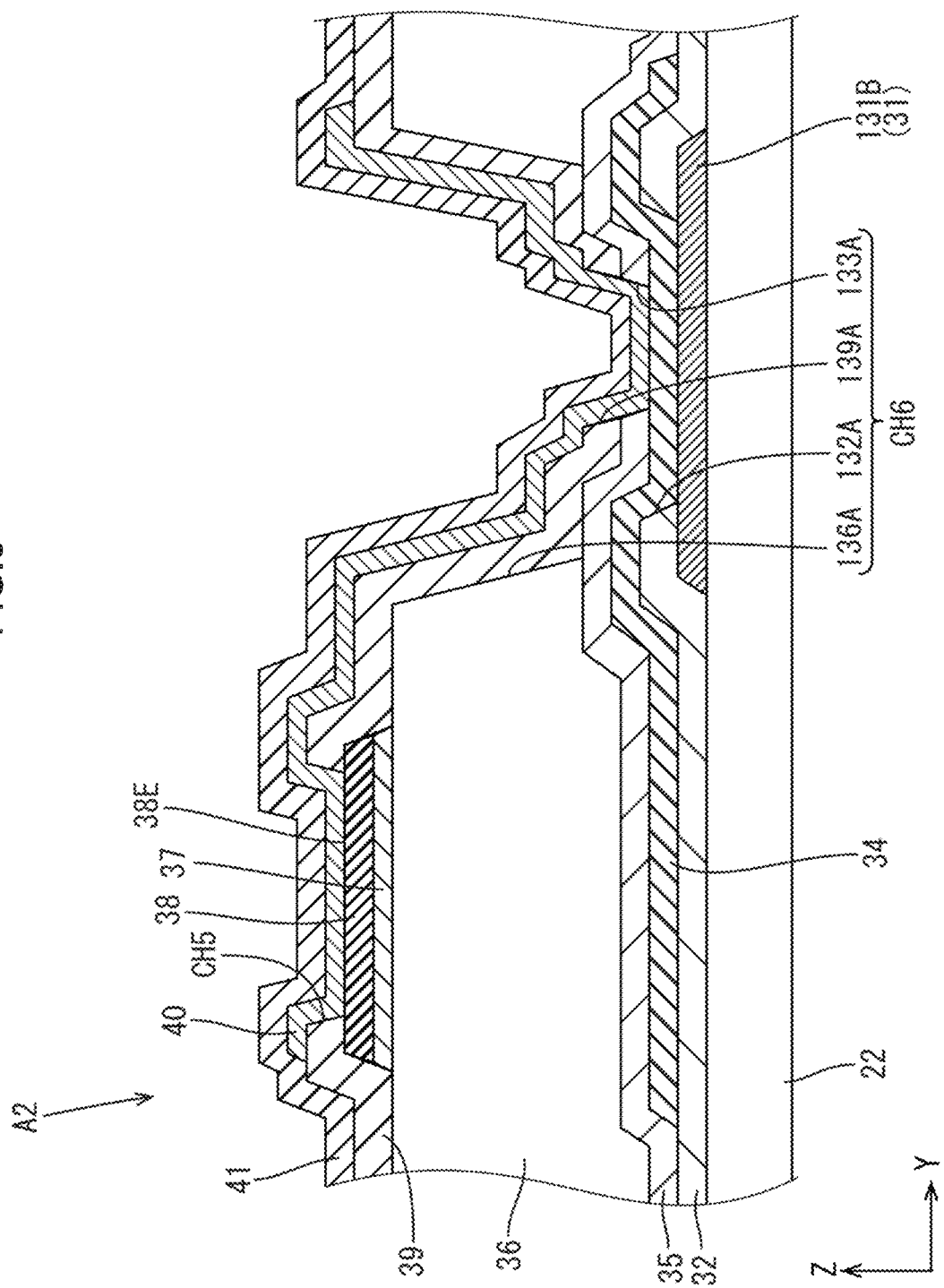
FIG. 6 is a cross-sectional view showing a contact hole in a second region of an array substrate according to a second embodiment (corresponding to a view taken along line VI-VI in FIG. 7).
Figure 7:
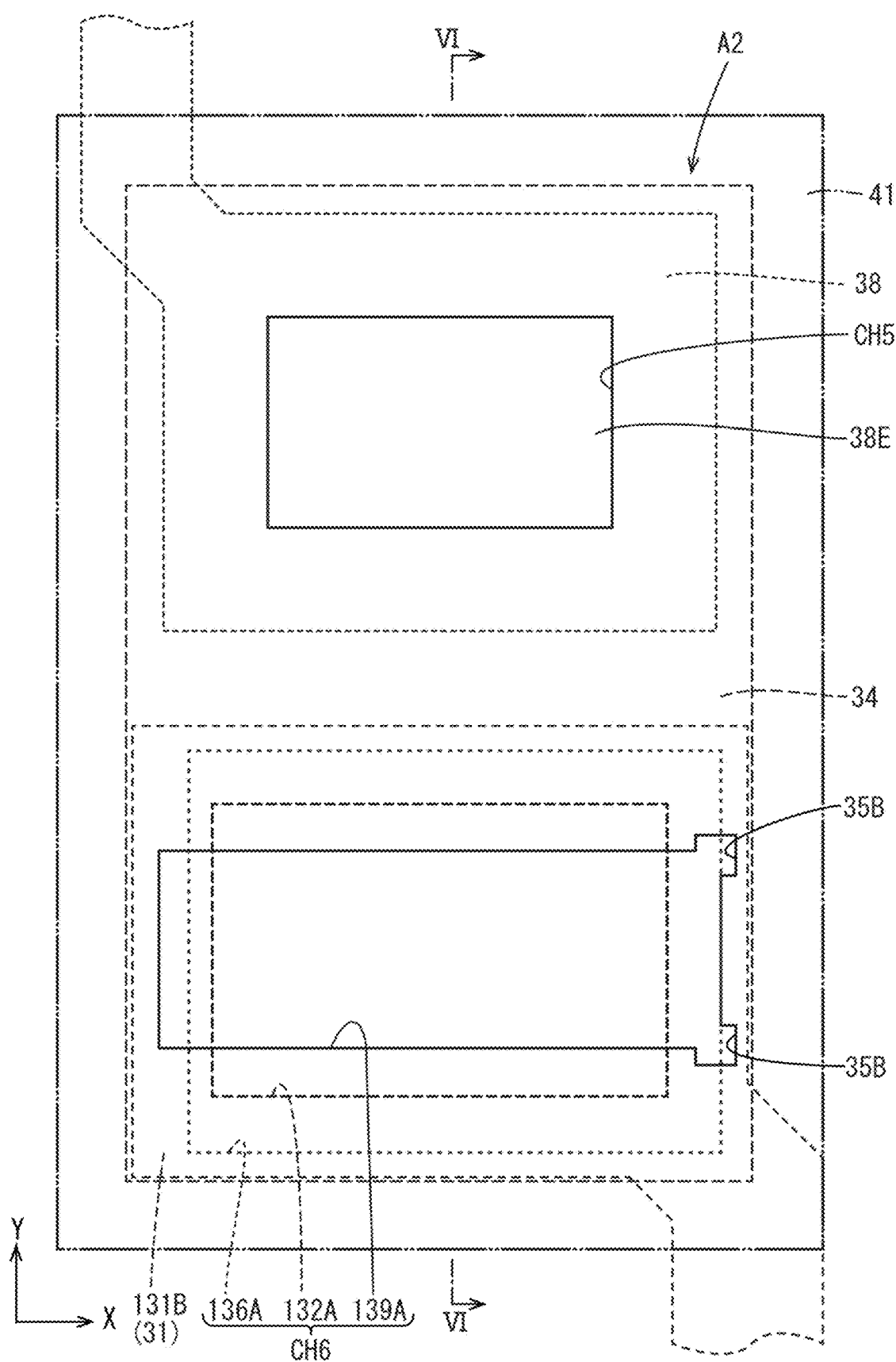
FIG. 7 is a plan view showing the contact hole in the second region of the array substrate according to the second embodiment.

Next, a second embodiment of the present invention will be described with reference to FIGS. 6 and 7. In the present embodiment, a configuration of the contact hole in the second region A2 is different from that in the above embodiment. Note that the same portions as those in the above embodiment are denoted by the same reference numerals and redundant description is omitted. In the present embodiment, as shown in FIG. 6, the line 38 and the transparent electrode film 40 are connected to each other via a contact hole CH5 formed to penetrate through the insulating film 39. In addition, the transparent electrode film 40 and a driver side line 131B are connected to each other via a contact hole CH6. In the present embodiment, the driver side line 131B (first conductive film) is formed of the gate conductive film 31. That is, the driver side line 131B is formed in an identical layer with a layer of the gate line 31A (pixel electrode line) in the array substrate 22 and is made of an identical material with a material of the gate line 31A.

The contact hole CH6 includes a through hole 132A in the gate insulating film 32, a through hole 135A in the insulating film 35, a through hole 136A in the flattening film 36, and a through hole 139A in the insulating film 39. In a portion where the contact hole CH6 is formed, the source conductive film 34 is interposed between the transparent electrode film 40 and the driver side line 131B, and the transparent electrode film 40 and the driver side line 131B are electrically connected to each other via the source conductive film 34. In addition, as shown in FIG. 7, the length in the Y-axis direction is set so as to decrease in the order of the through hole 136A in the flattening film 36, the through hole 132A in the gate insulating film 32, and the through hole 139A (and the through hole 135A) in the insulating film 39. In addition, the length in the X-axis direction is set so as to decrease in the order of the through hole 139A (and the through hole 135A) in the insulating film 39, the through hole 136A in the flattening film 36, and the through hole 132A in the gate insulating film 32.

Third Embodiment

Figure 8:
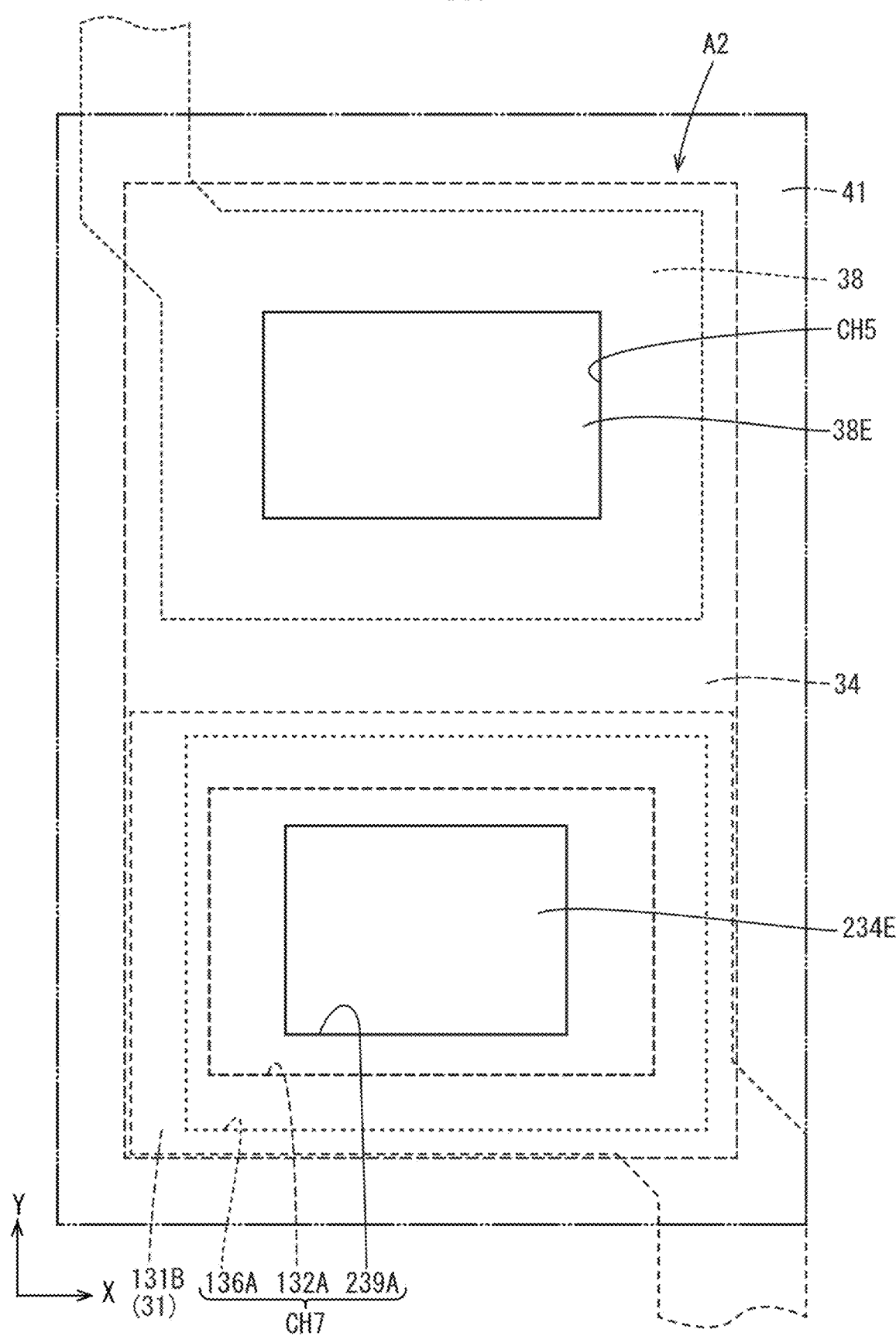
FIG. 8 is a plan view showing a contact hole in a second region of an array substrate according to a third embodiment.

Next, a third embodiment of the present invention will be described with reference to FIG. 8. In the present embodiment, a configuration of a contact hole CH7 for connecting the transparent electrode film 40 and the driver side line 131B is different from that of the second embodiment. The same portions as those in the above embodiment are denoted by the same reference numerals and redundant description is omitted. As shown in FIG. 8, a through hole 239A in the insulating film (and a through hole (not shown) in the insulating film 35) constituting the contact hole CH7 has the smallest area among the through holes constituting the contact hole CH7, and is specifically disposed in an inner area of the through hole 132A in the gate insulating film 32 in a plan view. As a result, an exposed portion 234E of the source conductive film 34 (and the driver side line 131B) in the contact hole CH7 is smaller than that in the second embodiment.

Fourth Embodiment

Figure 9:
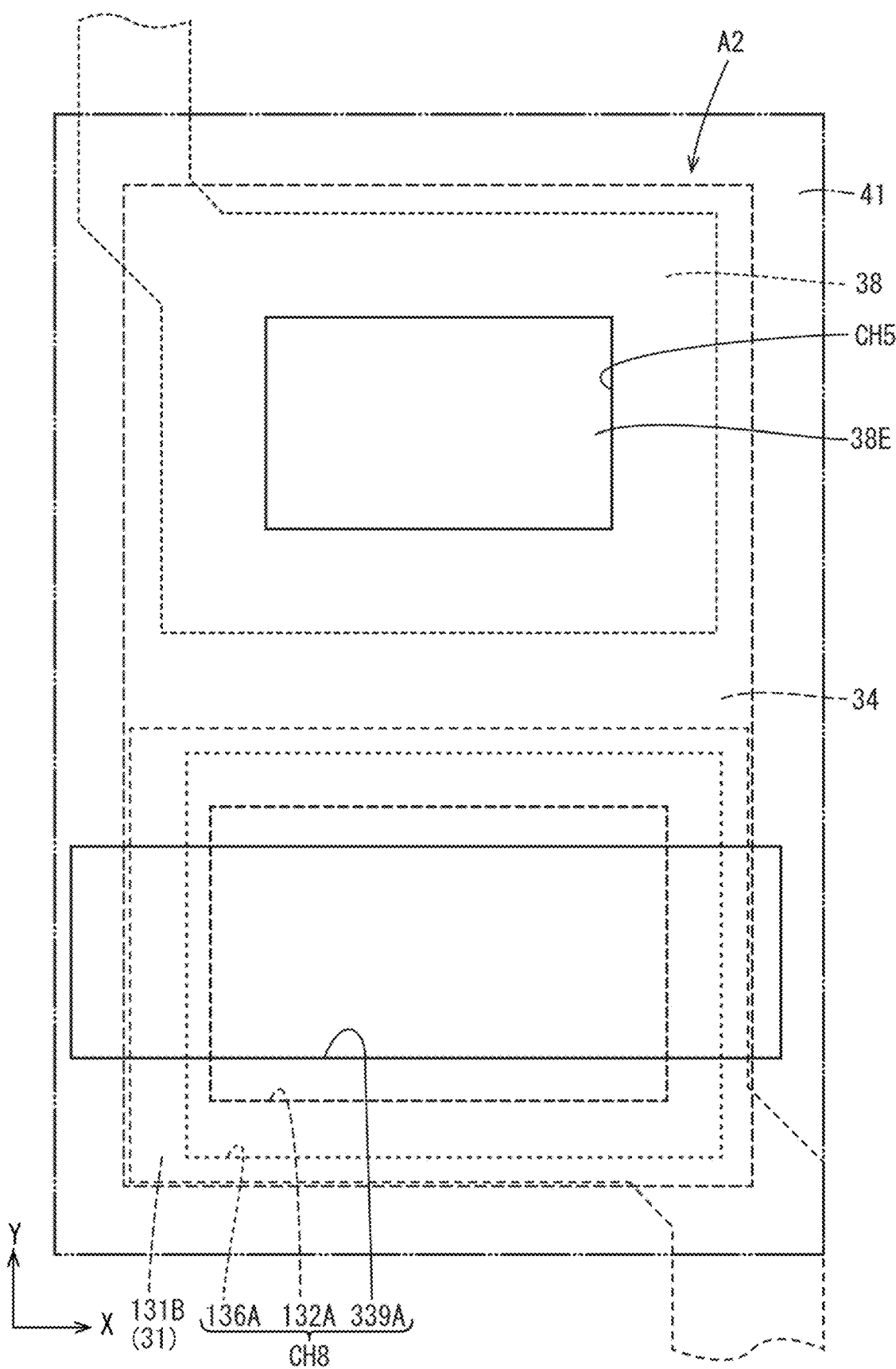
FIG. 9 is a plan view showing a contact hole in a second region of an array substrate according to a fourth embodiment.

Next, a fourth embodiment of the present invention will be described with reference to FIG. 9. In the present embodiment, a configuration of a contact hole CH8 for connecting the transparent electrode film 40 and the driver side line 131B is different from that in the above embodiment. The same portions as those in the above embodiment are denoted by the same reference numerals and redundant description is omitted. As shown in FIG. 9, a through hole 339A in the insulating film 39 (and the through hole (not shown) in the insulating film 35) constituting the contact hole CH8 has the smallest length in the Y-axis direction among the through holes that constitute the contact hole CH7. In addition, the through hole 339A in the insulating film 39 (and the through hole in the insulating film 35) has the largest length in the X-axis direction among the through holes that constitute the contact hole CH8. Accordingly, the contact areas of the transparent electrode film 40, the source conductive film 34, and the driver side line 131B are larger than those in the second and third embodiments, and electric resistance can be further reduced.

Fifth Embodiment

Next, a fifth embodiment of the present invention will be described with reference to FIG. 10. The same portions as those in the above embodiment are denoted by the same reference numerals and redundant description is omitted. As shown in FIG. 10, in the present embodiment, a contact hole CH9 is formed of a through hole 436A in the flattening film 36 and a through hole 435A in the insulating film 35, and a line 438 drawn from the position detection electrode 42B is electrically connected to the driver side line 34B via the contact hole CH9. In addition, a conductive film 437 is interposed between the line 438 and the flattening film 36 to improve the adhesion between the two members. In the present embodiment, the line 438 and the driver side line 34B are electrically connected to each other via the conductive film 437, but the conductive film 437 does not have to be provided, and the line 438 and the driver side line 34B may be directly connected to each other.

Other Embodiments

The present invention is not limited to the embodiments described above with reference to the drawings, and for example, the following embodiments are also included in the technical scope of the present invention.

(1) In the above embodiments, the transparent electrode film 40 that constitutes the pixel electrode 40A is exemplified as the transparent electrode film that connects the driver side line 34B and the line 38, but the transparent electrode film is not limited thereto. For example, the transparent electrode film 42 that constitutes the position detection electrode 42B may be used as the transparent electrode film that connects the driver side line 34B and the line 38. In addition, the driver side line 34B and the line 38 may be connected by a two-layer film in which the transparent electrode film 40 and the transparent electrode film 42 are stacked.

(2) The materials of each conductive film and each insulating film are not limited to the materials exemplified in the above embodiments, and can be changed as appropriate.

(3) The shape of the seal member 24 (and thus the shape of the first region A1) is not limited to the shape described above, and can be changed as appropriate.

(4) In the second embodiment, the transparent electrode film 40 and the driver side line 131B may be in direct contact with each other without the source conductive film 34 being interposed between the transparent electrode film 40 and the driver side line 131B.

(5) In the above embodiments, the first conductive film is exemplified as being used in the driver terminal line, and the second conductive film is exemplified as being used in the position detection electrode line, but the use of the first conductive film and the second conductive film is not limited to those described above, and can be changed as appropriate.

(6) In the above embodiments, the use of an In—Ga—Zn—O-based semiconductor is exemplified as the semiconductor film 33 of the TFT 43, but the semiconductor film 33 is not limited thereto. The material of the semiconductor film 33 can be changed as appropriate, and as the semiconductor film 33, for example, amorphous silicon may be used. However, the TFT including the In—Ga—Zn—O-based semiconductor has high mobility compared to a TFT including amorphous silicon, and thus is preferable because the TFT can be downsized.

EXPLANATION OF SYMBOLS

10: Liquid crystal display device
17: Driver
21: CF substrate (Other of a pair of substrates)
22: Array substrate (One of a pair of substrates)
23: Liquid crystal layer
24: Seal member
31A: Gate line (Pixel electrode line)
34A: Source line (Pixel electrode line)
34B: Driver side line (First conductive film)
34F: Terminal portion of driver side line
35: Insulating film (First insulating film)
38: Line (Second conductive film)
39: Insulating film (Third insulating film)
40: Transparent electrode film (Third conductive film)
40A: Pixel electrode
41: Insulating film (Second insulating film)
42B: Position detection electrode (Electrode)
43: TFT (Switching element)
A1: First region
A2: Second region
CH4, CH6, CH7, CH8, CH9: Contact hole (Contact hole)
CH3, CH5: Contact hole (Second conductive film side contact hole)

The invention claimed is:

1. A liquid crystal display device comprising:
a pair of substrates disposed facing each other;
a liquid crystal layer disposed between the pair of substrates;
a seal member disposed between the pair of substrates and surrounding the liquid crystal layer to seal the liquid crystal layer;
an electrode included in a first region of one substrate of the pair of substrates, the first region overlapping a region surrounded by the seal member;
a first conductive film included in a second region of the one substrate, the second region being a region outside the seal member;
a second conductive film included in the one substrate and extending from the electrode toward the first conductive film;
a first insulating film disposed between the first conductive film and the second conductive film, the first insulating film including a contact hole in a portion of the second region overlapping the first conductive film, and the first conductive film and the second conductive film being electrically connected to each other through the contact hole;
a second insulating film that covers the contact hole and is moisture-proof;
a third conductive film included in the one substrate and disposed on a liquid crystal layer side with respect to the first conductive film and the second conductive film, the third conductive film connecting the first conductive film and the second conductive film, and the third conductive film being connected to the first conductive film through the contact hole; and
a third insulating film disposed between the second conductive film and the third conductive film, the third conductive film including a second conductive film side contact hole in a portion of the second area overlapping the second conductive film, and the third conductive film and the second conductive film being electrically connected to each other through the second conductive film side contact hole,
wherein the second insulating film covers the second conductive film side contact hole.

2. The liquid crystal display device according to claim 1, wherein the third conductive film is a transparent electrode film.

3. The liquid crystal display device according to claim 1, wherein
the electrode and a position input body that performs a position input create a capacitance therebetween, and the electrode is a position detection electrode that detects an input position performed by the position input body, and the electrode includes electrodes that are disposed in the first region, and
the liquid crystal display device further includes:
a plurality of pixel electrodes disposed in the first region;
a driver disposed in the second region, electrically connected to the pixel electrodes and the position detection electrodes, and configured to drive the pixel electrodes and the position detection electrodes; and
a pixel electrode line included in the one substrate and electrically connecting the pixel electrodes and the driver,
the second conductive film includes a section as a line that electrically connects the position detection electrode and the driver, and
the first conductive film includes a section as a terminal portion of a driver side line connected to the driver.

4. The liquid crystal display device according to claim 3, wherein the first conductive film is included in a same layer as the pixel electrode line in the one substrate and is made of a same material as that of the pixel electrode line.

5. The liquid crystal display device according to claim 1, further comprising:
a pixel electrode included in the one substrate; and
a switching element included in the one substrate and electrically connected to the pixel electrode,
wherein the switching element is a TFT including an oxide semiconductor.

* * * * *